Figure 1:
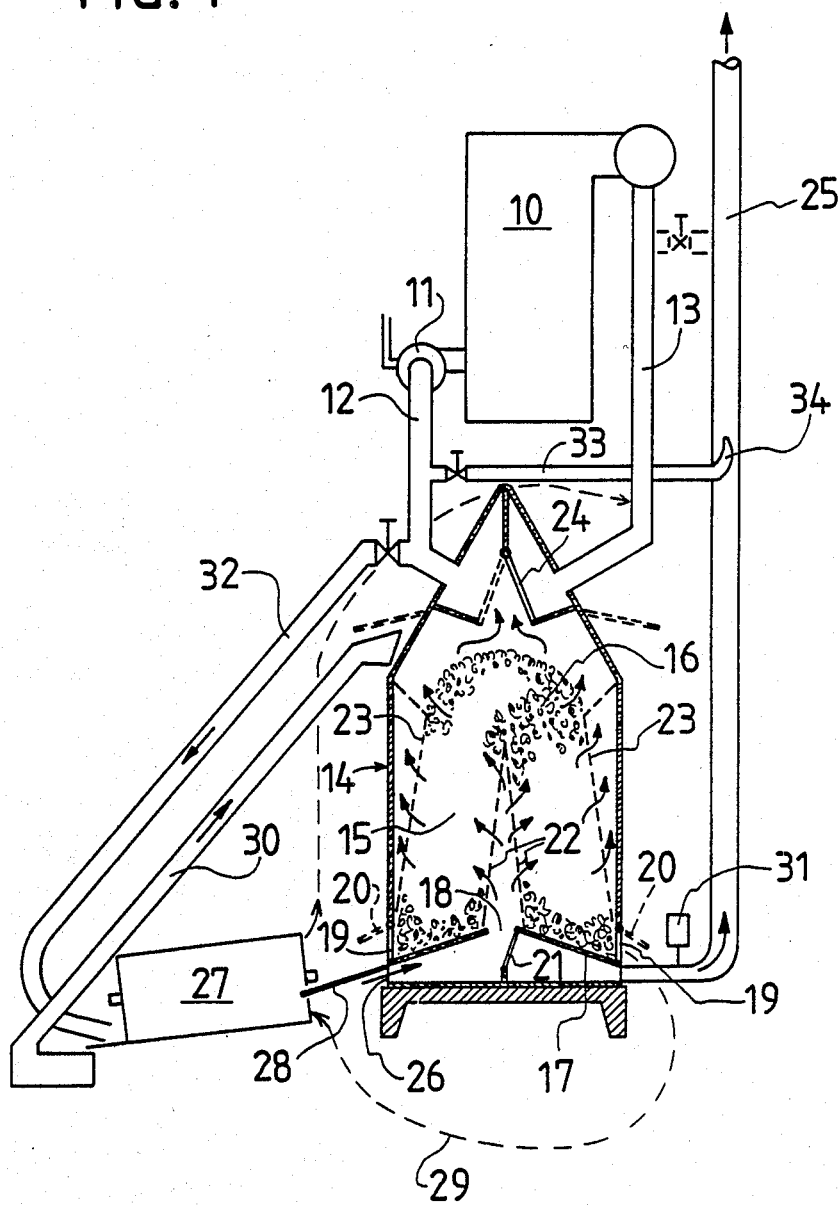

United States Patent [19]

Karlsson et al.

[11] Patent Number: 4,784,836
[45] Date of Patent: Nov. 15, 1988

[54] DEVICE FOR THE PURIFICATION OF GAS, ESPECIALLY COMBUSTION GAS

[76] Inventors: Lennart Karlsson, Ödenäs 4581, Alingsås, Sweden, 441 90; Leif Karlsson, Strandlyckan, Bollebygd, Sweden, 517 00

[21] Appl. No.: 41,624

[22] Filed: Apr. 22, 1987

Related U.S. Application Data

[63] Continuation of Ser. No. 828,308, filed as PCT SE85/00124 on Mar. 18, 1985, published as WO85/04237 on Sep. 26, 1985, abandoned.

[30] Foreign Application Priority Data

Mar. 16, 1984 [SE] Sweden .............................. 84/01478

[51] Int. Cl.$^4$ .............................................. B01D 53/08
[52] U.S. Cl. ...................................... 422/175; 55/181; 55/267; 55/390; 165/104.12; 422/181; 422/212; 422/213; 422/218; 422/219; 422/233; 423/244
[58] Field of Search ........................................ 55/77–79, 55/181, 267, 390; 165/104.12; 422/175, 181, 183, 188, 206, 212, 213, 216, 218, 219, 233; 423/244

[56] References Cited

U.S. PATENT DOCUMENTS

| | | | |
|---|---|---|---|
| 3,436,192 | 4/1969 | Karlsson | 422/181 X |
| 3,976,747 | 8/1976 | Shale et al. | 423/244 A |
| 3,977,833 | 8/1976 | Collina et al. | 422/218 X |
| 4,033,727 | 7/1977 | Vautrain | 422/218 |
| 4,121,432 | 10/1978 | Weil et al. | 165/104.12 X |
| 4,197,278 | 4/1980 | Gehri et al. | 423/244 A X |
| 4,224,041 | 9/1980 | Noack et al. | 422/216 X |
| 4,226,831 | 10/1980 | Dilworth | 422/175 X |
| 4,388,283 | 6/1983 | Abrams et al. | 423/244 A X |
| 4,519,995 | 5/1985 | Schröfelbauer et al. | 423/244 A |
| 4,568,524 | 2/1986 | Pelrine | 422/218 |

FOREIGN PATENT DOCUMENTS

| | | |
|---|---|---|
| 0077170-A1 | 4/1982 | European Pat. Off. |
| 2323875 | 11/1974 | Fed. Rep. of Germany |
| 8104412-5 | 1/1983 | Sweden |

Primary Examiner—Robert Spitzer
Attorney, Agent, or Firm—Wegner & Bretschneider

[57] ABSTRACT

Each of a pair of heat exchangers in a combustion plant includes a storage space holding basic granules, and will alternatingly be flown through by combustion gas and air, respectively. Residual heat from the combustion gas will be absorbed by the granules, and the moisture contend of the gases will condense upon the granules. Sulphur dioxide in the combustion gas will react with the basic material to calcium sulphite, and the moist granules will catch ash particles and other cntaminants in the gas. When valves have been re-set, air is made to pass through the granules, whereby it will be preheated. The heated air may be conducted to a burner, to a regeneration apparatus for the granules, or through a conduit to the gas exhaust duct. After some time of operation the granules are transferred to the regeneration apparatus, which includes a rotatable drum, where the granules will be subjected to mechanical working and separation of calcium sulphate and dust particles, preferably while being heated.

8 Claims, 2 Drawing Sheets

DEVICE FOR THE PURIFICATION OF GAS, ESPECIALLY COMBUSTION GAS

This application is a continuation of U.S. application Ser. No. 828,308 filed as PCT SE85/00124 on Mar. 18, 1985, published as WO85/04237 on Sep. 26, 1985, now abandoned.

Combustion gases from a furnace contain a certain amount of heat energy, which cannot be reclaimed in the combustion plant, or in conventional heat exchangers. There is also corrosive matter, such as sulphur compounds, dust particles and other contaminants, which are difficult to remove, and which may cause environmental trouble.

The object of the present invention is to propose a device, which permits an efficient utilization of the residual heat in combustion gases for heating air, and simultaneously makes it possible to purify the latter, comprising neutralization of corrosive/acid compounds and collecting gas entrained phases, particle-bound heavy metals and certain gaseous mercury compounds. The rest product will be a chemically stable compound, which may be easily disposed of.

The invention includes a regenerative heat exchanger connected to a plant producing contaminated gas, said heat exchanger comprising at least two units for alternate use and each having a storage space holding heat storing bodies and being provided with connections permitting the passage of combustion gas and air, respectively. The invention is characterized in that the heat storing bodies include a certain quantity of basic granules, each unit being provided with connections at its lower end and further connections at its upper end, as well as switch-over valves guiding the flow through the storage spaces, so contaminated gas will pass in one direction and alternatively air will pass in the opposite direction, wherein each unit and the gas inlet connection thereto are arranged so the temperature within the storage space will be reduced to below the dew point for moisture in the combustion gases.

The moisture will bind fly ashes, particle-bound heavy metals and certain gaseous mercury compounds, and will expedite the reaction between the sulphur dioxide and the basic granules.

The connections to the storage space are preferably arranged so the gas will pass the storage space from above, downwardly, whereas the air will pass from below, upwardly. Alternatively, the connections may be arranged so the gas will pass from the interior at the storage space and outwardly, whereas the air will pass from the exterior and inwardly. The storage space is advantageously provided with internal, perforated portion walls, dividing the space into at least two chambers, permitting a basically transverse flow of the gas, and air, respectively.

The heat exchanger is preferably combined with an apparatus for cleaning the basic granules, as well as means for transporting the granules from the storage space to the apparatus and back to the storage space, and for removing spent material therefrom. The cleaning apparatus preferably includes a rotating, heated drum. This may be provided with a connection for receiving part of the heated air, so the chemical reaction continues. Hereby calcium sulphite bound to the granules will be further oxidized into calcium sulphate. This is a stable and inert rest product, which may be deposed without noticeable inconvenience. The chemically spent surface layer of the granules will be ground off while the drum is rotated, so fresh material is available, when the granules are transferred back to the heat exchanger for re-use.

Part of the heated air may be transferred to the burner of a furnace, where the contaminated gas is produced.

During certain operating conditions an excess of heated air is produced in the heat exchanger. This may advantageously be transferred to the gas exhaust duct in order to increase the rising properties of the gases.

The heat exchanger is advantageously provided with means to measure the content of sulphur dioxide in the combustion gas effluent, and for governing the transfer of granules from and to the storage space to maintain a predetermined value of reaction intense basic contact surface.

Figure 2:
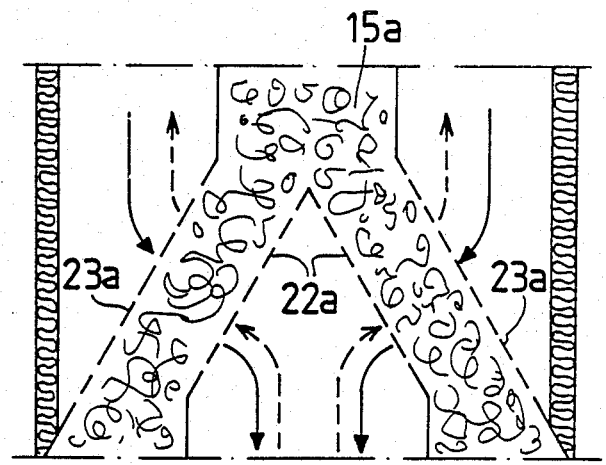
Figure 3:
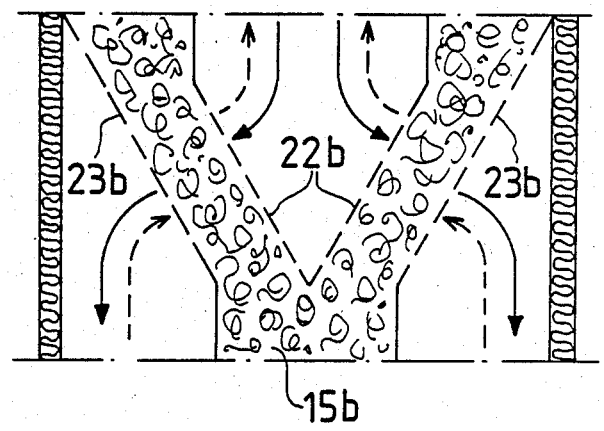
Figure 4:
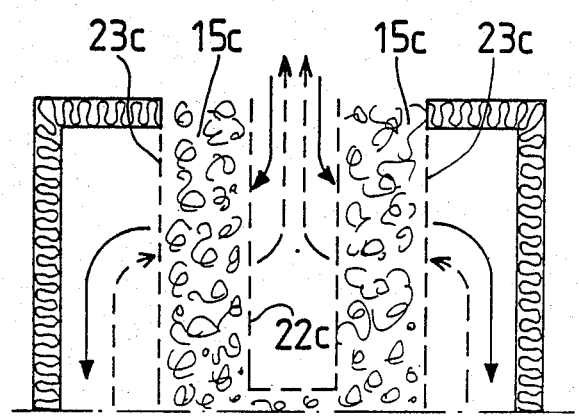

The invention will below be described with reference to the accompanying drawings, in which FIG. 1 shows a cross section through a heat exchanger according to the invention connected to a furnace, and a regeneration apparatus, which are schematically denoted, and FIGS. 2-4 schematically show different arrangements of the storage space and the passages therein.

In FIG. 1 reference 10 denotes a furnace forming part of a boiler provided with a burner 11 for gaseous, liquid or solid fuel, which is supplied with heated air from a combustion gas purifier/heat exchanger through a conduit 12. The combustion gas conduit directly connected to the boiler/furnace is denoted by 13.

In order to reclaim residual heat in the combustion gases, and to render undesirable emissions therein harmless there are heat exchangers/filters 14. These will alternatively be passed through by combustion gases, which give off part of their residual heat, and by air, which will be heated. The plant therefore includes at least two similar units, even if one only is shown in the drawing. Preferably a third unit is held as a reserve, which makes it possible to cut out each unit in turn for cleaning and overhaul.

The shape of the heat exchanger units may vary, and the size will of course depend upon the capacity of the combustion plant. A preferred embodiment comprises a tower-like structure, where the base measures are less than the height, and which encloses a storage space 15 containing basic granules 16. This advantageously contains crushed limestone, or similar matter, but may possibly consist of mecadam or some other carrier, provided with a basic surface coating.

In the embodiment shown, the storage space is provided with a bottom 17, which from a central, longitudinally running slot 18 is inclined downwardly to both sides, towards exits 19. These may be closed by lids 20, and adjacent to the slot 18 there is a flap valve 21.

The storage space 15 is provided with internal, as well as external partition walls 22 and 23, respectively. The internal partition walls 22 are mounted above the slot 18, and from a wedge-shaped void above the latter. The external partition walls 23 are parallel to the internal walls, whereby wedge-shaped voids remain between the external walls and the side walls of the unit.

The ridge-shaped roof of the unit is provided with connections for the air conduit 12 to the burner and the combustion gas conduit 13, respectively, and within the roof there is a second flap valve 24. The final gas effluent is denoted by 25, and issues from the space below the bottom 17.

The intention is that the storage space shall alternatively be passed by combustion gas and air, respectively, and with two units in operation in a plant one will be supplied with gases for heating the granules, while the other unit is supplied with air which is heated by previously heated granules. After some time of operation the flows of fluids are reversed.

In the operating position shown in the drawing the heat exchanger 14 is passed by air, utilizing the heat absorbed by the granules in a previous stage.

Air enters through an opening 26 to one side of the space below the bottom 17, which is located opposite to the connection for the combustion gas conduit 25. The flap valve 21 is swung (to the right in the drawing) so a connection is obtained from the opening 26, by way of slot 18, to the space between the internal partition walls 22.

Due to the design of the partition walls the air—and later the combustion gas—will pass substantially horizontally through the layers of granules, which have about uniform thickness.

The upper flap valve 24 is turned so it closes the connection to the combustion gas conduit 13, but maintains the connection with the air conduit open. When the flap valves 24 and 21 are turned to their alternative positions connections for combustion gases in, and out, respectively are opened, while the air passage is cut off.

There is always some moisture in the combustion gases, and in conventional plants the gas exit temperature is maintained so high, that no risk for condensation upon the heating surfaces of the boiler occurs. This means that there is rather much residual heat in the effluent.

The storage space 15 and the connection to the combustion gas exit is according to the invention arranged so condensation of steam occurs within the storage space. The precipitated moisture greatly enhances the reaction between the sulphur dioxide content in the combustion gases and the basic granules into calcium sulphite. The moist and sticky granules prevalent in a large portion of the storage space has a high capacity for catching fly ash, as well as particle-bound heavy metals and certain gaseous mercury compounds.

Beside the air preheating a good purification of the gases will be obtained. When air later on passes through the granules and is heated the calcium sulphite, initially formed, will at least partly be further oxidized towards the more stable, final product calcium sulphate.

After some time of use the surface layer of the granules will be less reaction active. The mass of granules is made to slowly pass downwards in the unit, so spent material is removed at its bottom, while new, reaction-inclined material is supplied at the top.

In the drawing reference 27 denotes a rotatable drum enclosed in a casing (not shown), to which the granules are supplied by some suitable transport means 28. Transfer of granules from the opposite side of the unit will occur by some similar means—the transport part is indicated by the broken line 29.

A regeneration and a mechanical cleaning of the granules occurs in the drum 27. The surface layers of the granules are worn off and separated, for instance by the drum being perforated, wholly or in part. Hereby powdery stuff and smaller pieces from the granules will be removed while the cleaned granules are fed out of the drum by suitable means (not shown).

The cleaning apparatus is preferably common to the two heat exchanger units and contains an excess of granules, which is being treated while both storage spaces remain filled.

Transfer back to the storage spaces occurs by means of some suitable device 30, for instance a bucket or screw conveyor. A device 31 connected to the combustion gas effluent senses the content of sulphur dioxide in the combustion gases leaving the plant, and will govern the circulation of granules so the sulphur dioxide content does not exceed a predetermined value.

The heat content of the combustion gases is usually higher than what it is possible to utilize for heating the air to the burner. The surplus of air can be transferred to the drum 27 by way of conduit 32. The hot air promotes the oxidation of the calcium sulphite on the granules into calcium sulphate, which is a stable rest product, which can easily be separated from the granules by mechanical wear, or washing. The air leaving the drum may carry a certain amount of dust and is preferably transferred to the combustion gas conduit 13 or directly to the units 14, so the contaminated air must pass the granule store, where the dust will be collected.

On these occasions when the excess of air is not needed in the cleaning apparatus 27 part of the air may be transferred to the combustion gas effluent 25 by way of a conduit 33 terminating in a nozzle 34, in order to increase the rising properties of the combustion gases.

FIGS. 2-4 schematically show some alternative embodiments of granule stores, and the combustion gas and air conduits connected thereto. In all figures the air paths are shown in full lines, while the paths of combustion gases are shown in broken lines.

The embodiment according to FIG. 2 largely corresponds to that of FIG. 1, but the storage space 15a has a form more like an inverted V. The partition walls 22a, 23a are inclined about corresponding to, or slightly exceeding the natural angle of repose of the granules.

Here comparatively small surfaces on the cold side are exposed towards the possibly still corrosive gases.

FIG. 3 shows a modification where the walls 22b, 23b defining the storage space have the form of a regular V. Here the surfaces at the cold side will be correspondingly bigger than in the previous example, but on the other hand there are small surfaces only at the warm side, which must be insulated to prevent condensation.

As is evident from FIG. 4, the partition walls 22c, 23c can be located vertically. In this manner two parallel part storage shafts 15c are obtained, which may be completely separated, or may be interconnected by supply and feeding-out means for the granules. The combustion gases will pass from within and outwardly, while air passes from without and inwardly.

The embodiments above described and shown in the drawings are to be regarded as examples only, and the components thereof may be varied in many ways within the scope of the appended claims. The storage space may be formed as a single shaft—located between two partition walls, and the bottom 17 can be formed so its sides slope towards the center. These will ensure a simpler feeding-out of the granules.

Instead of the rotating drum 27, a shaking screen or some similar device may be used, where the granules will be subjected to mechanical wear and the influence of air, while simultaneously smaller particles are removed.

The invention is described as used in connection with a furnace, but it is evident that it may also be used in connection with industrial processes, where hot, contaminated gas is produced.

We claim:

1. A heat exchanger connectable to a furnace producing contaminated effluent gas and adapted to purify said gas while simultaneously preheating air to said furnace comprising:
    (a) at least two like units each having two ends and enclosing a storage space holding heat storing bodies comprising a predetermined quantity of basic granules,
    (b) each unit being provided with air inlet means and combustion gas outlet means at one end thereof and air outlet means and combustion gas inlet means at the other end thereof,
    (c) switch over valve means at said ends for guiding the flow of air and gas through the heat storing bodies in said storage space such that, alternating from one unit to another, contaminated gas will pass in one direction through one of said units while, simultaneously, air will pass in the opposite direction through another unit,
    (d) each storage space and the heat storing bodies therein being adapted to ensure that the temperature of the gas passing through the associated unit is reduced to below the dew point for the moisture in the gas before it leaves the unit,
    (e) first conduit means for transferring purified gas from said units to an exhaust duct,
    (f) second conduit means for transferring heated air to said furnace from said units, and
    (g) a rotatable drum outside said storage spaces for cleaning the basic granules, means to heat said drum, as well as means for transporting granules from either storage space to said drum and back to the storage spaces.

2. A heat exchanger according to claim 1 further comprising means to measure the content of sulphur dioxide in the combustion gas leaving the storage space occasionally handling gas, for governing the transfer of granules from and to said storage space, to maintain a predetermined value of reaction intense basic contact surface in said storage space.

3. A heat exchanger connectable to a furnace producing contaminated effluent gas and adapted to purify said gas while simultaneously preheating air to said furnace comprising:
    (a) at least two like units each having two ends and enclosing a storage space holding heat storing bodies comprising a predetermined quantity of basic granules,
    (b) each unit being provided with air inlet means and combustion gas outlet means at one end thereof and air outlet means and combustion gas inlet means at the other end thereof,
    (c) switch over valve means at said ends for guiding the flow of air and gas through the heat storing bodies in said storage space such that, alternating from one unit to another, contaminated gas will pass in one direction through one of said units while, simultaneously, air will pass in the opposite direction through another unit,
    (d) each storage space and the heat storing bodies therein being adapted to ensure that the temperature of the gas passing through the associated unit is reduced to below the dew point for the moisture in the gas before it leaves the unit,
    (e) first conduit means for transferring purified gas from said units to an exhaust duct,
    (f) second conduit means for transferring heated air to said furnace from said units, and
    (g) a device outside said storage spaces for cleaning the basic granules, as well as means for transporting granules from either storage space to the device and back to the storage spaces in which said device comprises a rotatable drum as well as third conduit means for transferring heated air from said second conduit means to said cleaning drum.

4. A heat exchanger connectable to a furnace producing contaminated effluent gas and adapted to purify said gas while simultaneously preheating air to said furnace comprising:
    (a) at least two like units each having two ends and enclosing a storage space holding heat storing bodies comprising a predetermined quantity of basic granules,
    (b) each unit being provided with air inlet means and combustion gas outlet means at one end thereof and air outlet means and combustion gas inlet means at the other end thereof,
    (c) switch over valve means at said ends for guiding the flow of air and gas through the heat storing bodies in said storage space such that, alternating from one unit to another, contaminated gas will pass in one direction through one of said units while, simultaneously, air will pass in the opposite direction through another unit,
    (d) each storage space and the heat storing bodies therein being adapted to ensure that the temperature of the gas passing through the associated unit is reduced to below the dew point for the moisture in the gas before it leaves the unit,
    (e) conduit means for transferring purified gas from said units to an exhaust duct,
    (f) further conduit means for transferring heated air to said furnace from said units,
    (g) a heated, rotatable drum for cleaning the basic granules, as well as means for transporting the granules from either storage space to the drum and back to the storage spaces,
    (h) means to measure the content of sulphur dioxide in the combustion gas leaving the stoage space transferring gas for governing the transfer of granules to and from said storage space, to maintain a predetermined value of reaction intense basic contact surface in said storage space, and
    (i) a conduit for transferring heated air from said units to said cleaning drum.

5. A heat exchanger according to claim 4 further comprising a conduit for transferring heated air from said units to said exhaust duct.

6. A heat exchanger according to claim 5 further comprising perforated partition walls dividing each of said storage spaces into at least two chambers such that one of said chambers contains said heat storing bodies.

7. A heat exchanger connectable to a furnace producing contaminated effluent gas and adapted to purify said gas while simultaneously preheating air to said furnace comprising:
    (a) at least two like units each having two ends and enclosing a storage space holding heat storing bodies comprising a predetermined quantity of basic granules,
    (b) each unit being provided with air inlet means and combustion gas outlet means at one end thereof and air outlet means and combustion gas inlet means at the other end thereof,
    (c) switch over valve means at said ends for guiding the flow of air and gas through the heat storing bodies in said storage space such that, alternating from one unit to another, contaminated gas will pass in one direction through one of said units while, sumultaneously, air will pass in the opposite direction through another unit, (d) each storage space and the heat storing bodies therein being adapted to ensure that the temperature of the gas passing through the associated unit is reduced to below the dew point for the moisture in the gas before it leaves the unit, (e) first conduit means for transferring purified gas from said units to an exhaust duct, (f) second conduit means for transferring heated air to said furnace from said units, and (g) third conduit means for transferring heated air from said units to said exhaust duct.

8. A heat exchanger connectable to a furnace producing contaminated effluent gas and adapted to purify said gas while simultaneously preheating air to said furnace comprising:

(a) at least two like units each having two ends and enclosing a storage space holding heat storing bodies comprising a predetermined quantity of basic granules, (b) each unit being provided wit air inlet means and combustion gas outlet means at one end thereof and air outlet means and combustion gas inlet means at the other end thereof, (c) switch over valve means at said ends for guiding the flow of air and gas through the heat storing bodies in said storage space such that, alternating from one unit to another, contaminated gas will pass in one direction through one of said units while, simultaneously, air will pass in the opposite direction through another unit, (d) each storage space and the heat storing bodies therein being adapted to ensure that the temperature of the gas passing through the associated unit is reduced to below the dew point for the moisture in the gas before it leaves the unit, (e) first conduit means for transferring purified gas from said units to an exhaust duct, (f) second conduit means for transferring heated air to said furnace from said units, and (g) each of said storage spaces comprising perforated partition walls dividing each of said spaces into at least two chambers, such that one of said chambers contains said heat storing bodies.

* * * * *